United States Patent
Ladzinski et al.

(10) Patent No.: US 8,246,069 B2
(45) Date of Patent: Aug. 21, 2012

(54) BREAK AWAY TOW HOOK

(75) Inventors: Kenneth J. Ladzinski, Almont, MI (US); Dennis F. Stedman, Ortonville, MI (US); Khaja A. Ahmed, Rochester Hills, MI (US); Arun Kumar, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 157 days.

(21) Appl. No.: 12/782,246

(22) Filed: May 18, 2010

(65) Prior Publication Data
US 2011/0285107 A1 Nov. 24, 2011

(51) Int. Cl.
*B60D 1/04* (2006.01)

(52) U.S. Cl. .............. 280/495; 280/446.1; 280/449; 280/504

(58) Field of Classification Search .......... 280/495, 280/504, 446.1, 500, 501, 451, 449; 293/117
See application file for complete search history.

(56) References Cited

U.S. PATENT DOCUMENTS

| | | | | |
|---|---|---|---|---|
| 2,444,876 A | * | 7/1948 | Kuhl | 280/495 |
| 2,468,669 A | * | 4/1949 | Holmes | 280/451 |
| 6,802,522 B1 | | 10/2004 | Park et al. | |
| 6,896,281 B2 | | 5/2005 | Lenzen et al. | |
| 7,472,919 B2 | * | 1/2009 | Pratt et al. | 280/480.1 |

FOREIGN PATENT DOCUMENTS

JP 2003-2136 * 1/2003

* cited by examiner

*Primary Examiner* — Anne Marie M Boehler
(74) *Attorney, Agent, or Firm* — Frederick A. Krieger

(57) ABSTRACT

A tow hook assembly that includes a mount bracket, a tow hook having a towing end and a mounting end extending axially along a towing direction and through the mount bracket, a support bracket positioned proximal to the towing end of the tow hook and configured to support the towing end of the tow hook, and a fastener attached to the mounting end of the tow hook. The tow hook assembly is attached between the frame rail and impact beam of a motor vehicle such that the motor vehicle may be towed by the tow hook assembly and such that the tow hook assembly will break away from the motor vehicle upon application of a force which is less than a force required to activate an airbag.

17 Claims, 5 Drawing Sheets

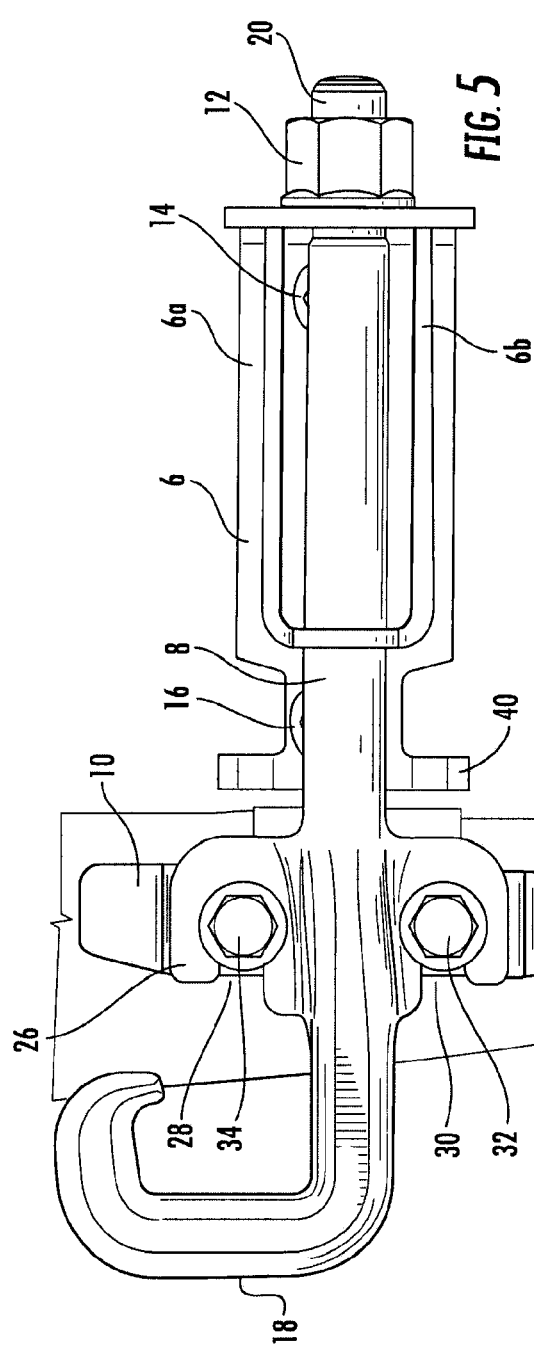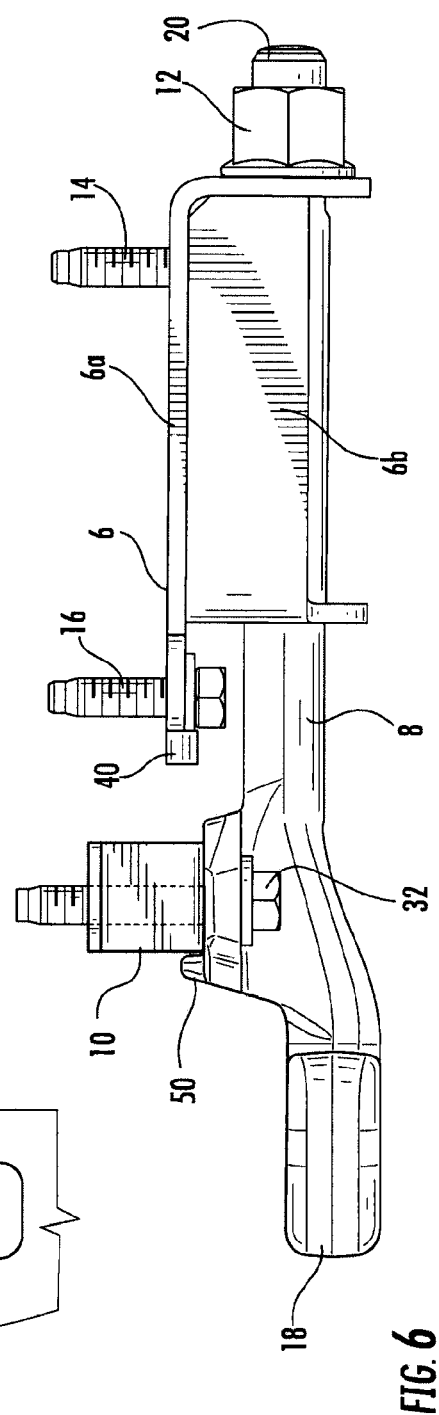

BREAK AWAY TOW HOOK

FIELD OF THE INVENTION

The embodiments disclosed herein relate to tow hooks for motor vehicles, and more particularly to tow hooks that are adapted to break away during a minimal impact so as not to transfer a force sufficient to deploy an airbag.

BACKGROUND OF THE INVENTION

Motor vehicles, and particularly trucks, are known to have one or more tow hooks mounted to a front end or rear end thereof. These tow hooks provide a convenient attachment point for a rope, strap or cable when the motor vehicle is being towed or pulled out of a predicament, secured from movement during shipping, or when the motor vehicle is doing the pulling from its front end or rear end.

Motor vehicles, including trucks, are also required to have supplemental restraint systems, such as air bags, installed for occupant safety. These supplemental restraint systems are generally intended to activate at the command of a control system that detects a frontal impact of a specified severity. It is not desirable for the air bag to activate without such an impact occurring. The motor vehicle is also built with a front bumper system that is adapted to readily absorb, in a planned and prescribed fashion, frontal impacts of lesser severity without activating the air bag. A tow hook assembly that is rigidly mounted to a front bumper of the vehicle presents additional challenges to designing for these desirable response characteristics, as the tow hook might protrude from the face of the bumper, and thereby become the initial point of contact during an impact.

Due to the location and nature of such prior art tow hooks, a motor vehicle provided with both an airbag system and tow hooks has often required adjustment of the airbag system to accommodate the effect of the tow hook(s) to meet desired airbag deployment requirements during low speed impact events. Consequently, it is desirable to provide tow hooks on an automobile that will perform their intended towing function, but will not affect the operation of the airbag system.

SUMMARY OF THE INVENTION

In accordance with a first aspect of an embodiment of the invention, a tow hook assembly for an automobile is provided. The tow hook assembly includes a mount bracket, a tow hook having a towing end and a mounting end extending axially along a towing direction and through the mount bracket, a support bracket positioned proximal to the towing end of the tow hook and configured to support the towing end of the tow hook, and a fastener attached to the mounting end of the tow hook. The tow hook assembly is attached between the frame rail and impact beam of a motor vehicle such that the motor vehicle may be towed by the tow hook assembly and such that the tow hook assembly will break away from the motor vehicle upon application of a force which is less than a force required to activate an airbag.

In accordance with another aspect of an embodiment of the invention, the mount bracket and the support bracket are adapted to release the tow hook by allowing the tow hook to move in a direction substantially opposite to the towing direction when the tow hook is contacted by a force in a direction substantially opposite to the towing direction.

In another aspect of an embodiment of the invention, the mount bracket is configured to retain the tow hook within the mount bracket if the tow hook moves more than a predetermined distance in a direction opposite to the towing direction.

In yet another aspect of an embodiment of the invention, the tow hook includes a tab positioned proximal to the towing end. The tab is positioned and dimensioned so as to be in front of the support bracket, and is engineered so that the tow hook will remain substantially in place until a force in a direction opposite to the towing direction exceeds a predetermined value that is less than the force required to deploy the vehicle air bags. Once the force exceeds this value, the tow hook moves in the direction opposite the towing direction and at least one of the tab and the support bracket is deformed so as to allow movement of the tow hook in the direction opposite to the towing direction

BRIEF DESCRIPTION OF THE DRAWINGS

The figures are for illustration purposes only and are not necessarily drawn to scale. The invention itself, however, may best be understood by reference to the detailed description which follows when taken in conjunction with the accompanying drawings, in which like reference numbers denote like components, and in which:

FIG. 5 is a bottom plan view of the tow hook assembly of FIG. 4; and

FIG. 6 is a side elevation view of the tow hook assembly of FIG. 5.

DETAILED DESCRIPTION OF THE INVENTION

The following description of the preferred embodiment(s) is merely exemplary in nature and is in no way intended to limit the claimed invention, its application, or uses. As a point of clarity, FIGS. 1-6 are views from the underside of the motor vehicle to which the tow hook assembly is attached, as the preferred mounting configuration is on the bottom of the motor vehicle's frame rail. It is contemplated, however, that the tow hook assembly may be adapted for mounting on the top of the frame rail.

Figure 1:
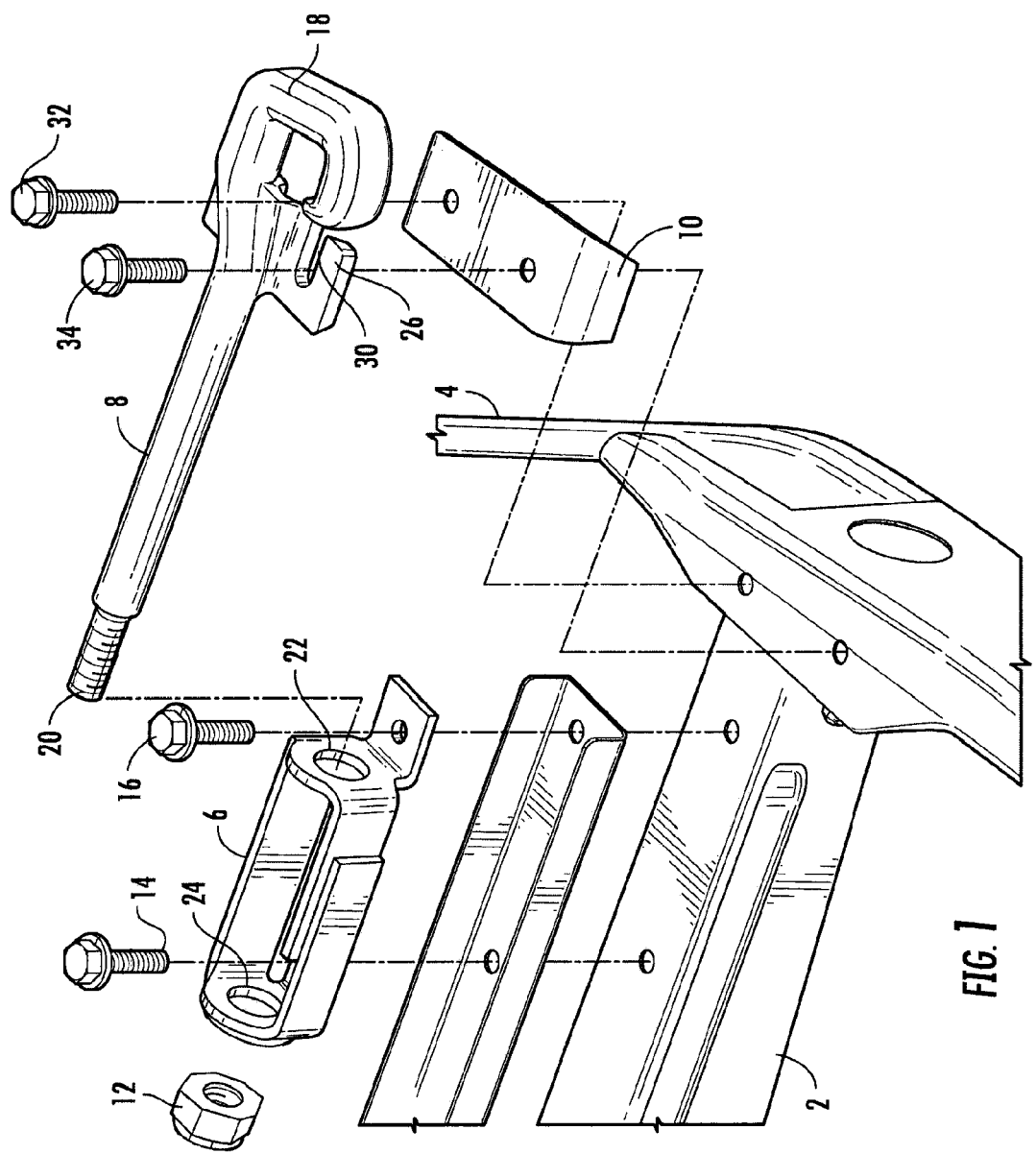
FIG. 1 is an assembly view of the tow hook assembly according to an embodiment of the invention.
Figure 2:
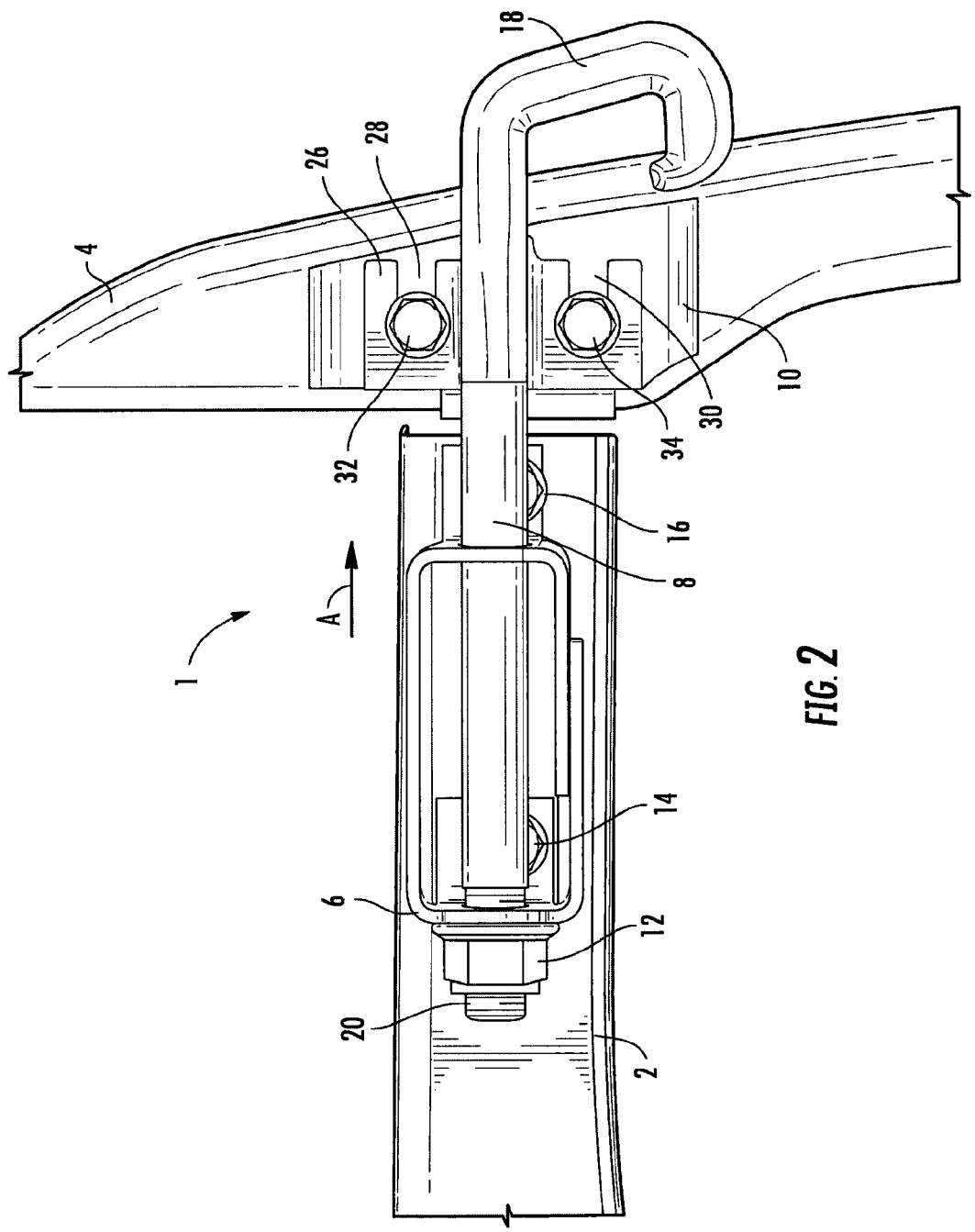
FIG. 2 is a bottom plan view of the tow hook assembly according to an embodiment of the invention.
Figure 3:
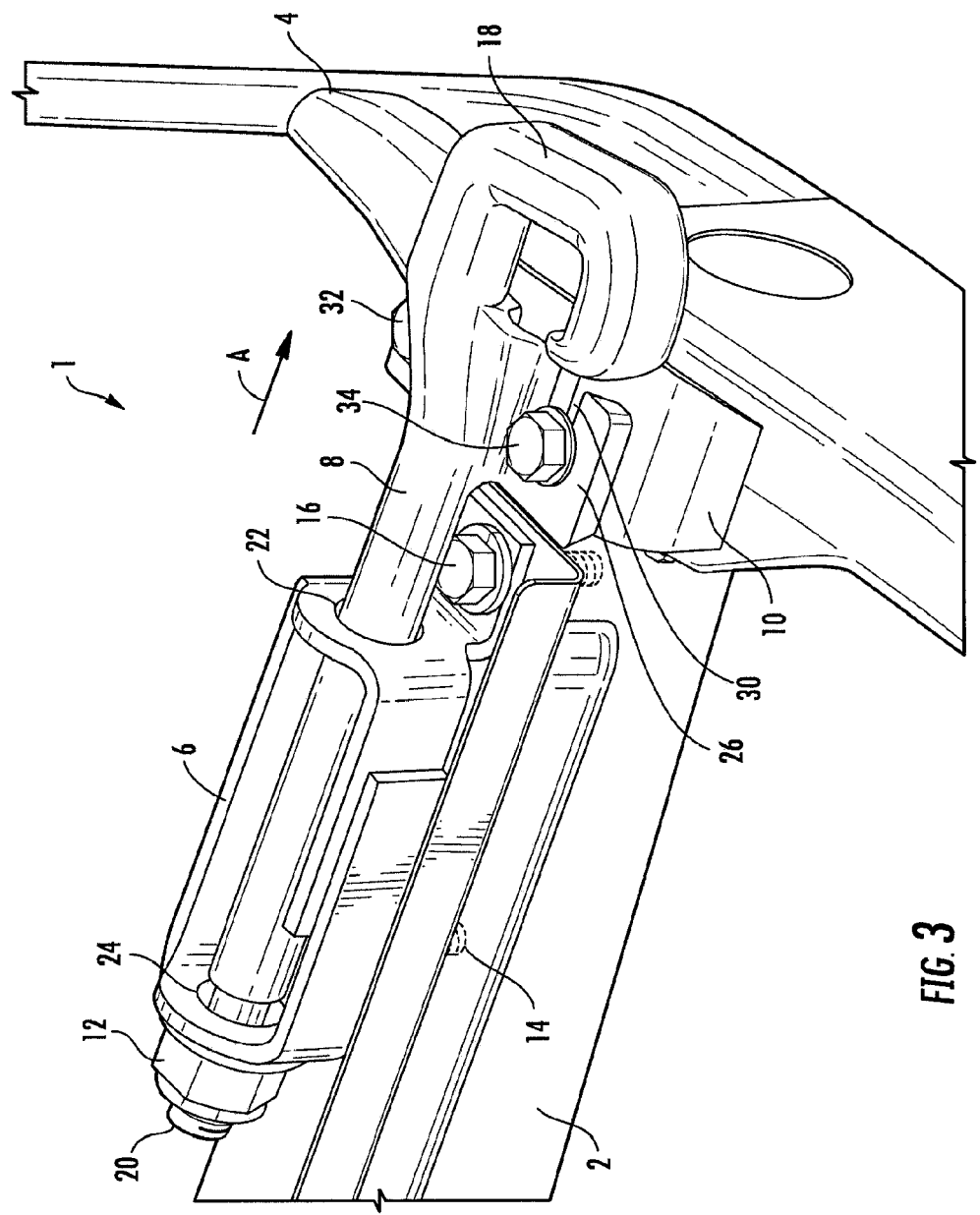
FIG. 3 is a side perspective view of the tow hook assembly of FIG. 2.

Referring now to the drawings, FIGS. 1-3 illustrate an embodiment of a tow hook assembly 1 according to the invention. The tow hook assembly 1 is shown as being adapted for mounting between a frame rail 2 and an impact beam 4 of a motor vehicle. As described below, each tow hook assembly 1 is attached between the frame rail 2 and impact beam 4 of the motor vehicle such that the motor vehicle may be towed by the tow hook assembly 1 and such that the tow hook assembly 1 will break away from the motor vehicle upon application of a force which is less than a force required to activate an airbag.

The tow hook assembly 1 includes a mount bracket 6, a tow hook 8, a support bracket 10 and a fastener 12. The mount bracket 6 is preferably attached to the frame rail 2 of the motor vehicle using bolts 14, 16 as shown in FIGS. 1-3. The support bracket 10 is preferably welded to the impact beam 4 of the motor vehicle. It will be readily apparent that the mount bracket 6 and/or the support bracket 10 can be attached to the appropriate portions of the motor vehicle with bolts, welding, or any other means known in the art. It will also be readily apparent that, depending on the particular design of the motor vehicle, both the mount bracket and the support bracket could be attached to the frame rail.

The tow hook 8 includes a towing end 18 and a mounting end 20. The towing end 18 is adapted to be engaged by a tow rope, strap or cable so that the motor vehicle may be towed thereby. As shown in FIGS. 1-3, the towing end 18 of the tow hook 8 is preferably configured as an open loop hook. Other towing end shapes can be utilized, such as a closed loop, or an upward or downward facing hook.

During assembly, the tow hook 8 is positioned so that it extends axially along a towing direction (indicated by arrow A in FIG. 2), and the mounting end 20 is passed through two apertures 22, 24 in the mount bracket 6 until the mounting end 20 extends through the mounting bracket 6. The tow hook 8 also includes a flange 26 located proximal to the towing end 18 and extending from either side of the tow hook 8. Each side of the flange 26 includes at least one slot 28, 30 that extends in the towing direction A. Bolts 32, 34 are provided to pass through the slots 28, in the flange 26 and attach the flange 26 of the tow hook 8 to the support bracket 10 such that the support bracket 10 supports the towing end 18 of the tow hook 8.

A fastener 12 is attached to the mounting end 20 of the tow hook 8. The fastener 12 is configured to contact the mount bracket 6 when the tow hook 8 is pulled in the towing direction A so as to resist movement of the tow hook 8 relative to the mount bracket 6 in the towing direction and allow movement of the tow hook 8 in a direction opposite to the towing direction A. Preferably, the fastener 12 is a prevailing torque feature. For example, as shown in FIGS. 1-3, the mounting end 20 of the tow hook 8 is a threaded end and the fastener 12 is a prevailing torque nut, i.e., a nut which is torqued to a specified value so as to resist self loosening due to vibration. Alternatively, the prevailing torque feature could be a crimp nut attached to the mounting end of the tow hook, a threadlock nut, or a threaded nut attached to the mounting end with an adhesive. Regardless of the design employed, the prevailing torque feature is preferably tuned to the specific motor vehicle to which the tow hook assembly is attached, and engineered to withstand a towing direction force of at least 2 times the gross domestic weight of the motor vehicle.

In a typical installation, the towing end 18 of the tow hook 8 is generally exposed beyond the front fascia of the motor vehicle in order to aid its use in towing. Thus, the tow hook 8 is susceptible to being impacted during collision of the motor vehicle with another object. A sufficient impact on the tow hook 8 in a direction generally opposite to the towing direction A will cause the tow hook 8 to move rearward with respect to the mount bracket 6. With the slots 28, 30 provided in each side of the flange 26 of the tow hook 8, and the fastener 12 being attached to the mounting end 20 of the tow hook 8 so as to allow movement of the tow hook 8 in a direction opposite to the towing direction, the tow hook 8 is free to slide in the direction opposite to the towing direction.

Since the tow hook 8 passes through the apertures 22, 24 in the mount bracket, has the fastener 12 on the mounting end 20 thereof and the flange 26 located proximal to the towing end 18, the mount bracket 6 is capable of retaining the tow hook 8 within the mount bracket 6 even if the tow hook 8 moves a distance sufficient enough where the slots 28, 30 of each flange 26 completely disengage from the bolts 32, 34 that secure the tow hook 8 to the support bracket 10. Specifically, and as shown in FIGS. 2 and 3, the tow hook 8 is retained in the mount bracket 6 because the flange 26 and the fastener 12 are preferably dimensioned to be larger than the apertures 22, 24 in the mounting bracket 6.

Preferably, the force required to move the tow hook 8 in a direction opposite to the towing direction A is less than the force required to activate the airbag. Specifically, it is preferred that the tow hook assembly 1 is engineered such that the force required to move the tow hook 8 in the direction opposite the towing direction A is at least 0.5 times the gross domestic weight of the motor vehicle.

Figure 4:
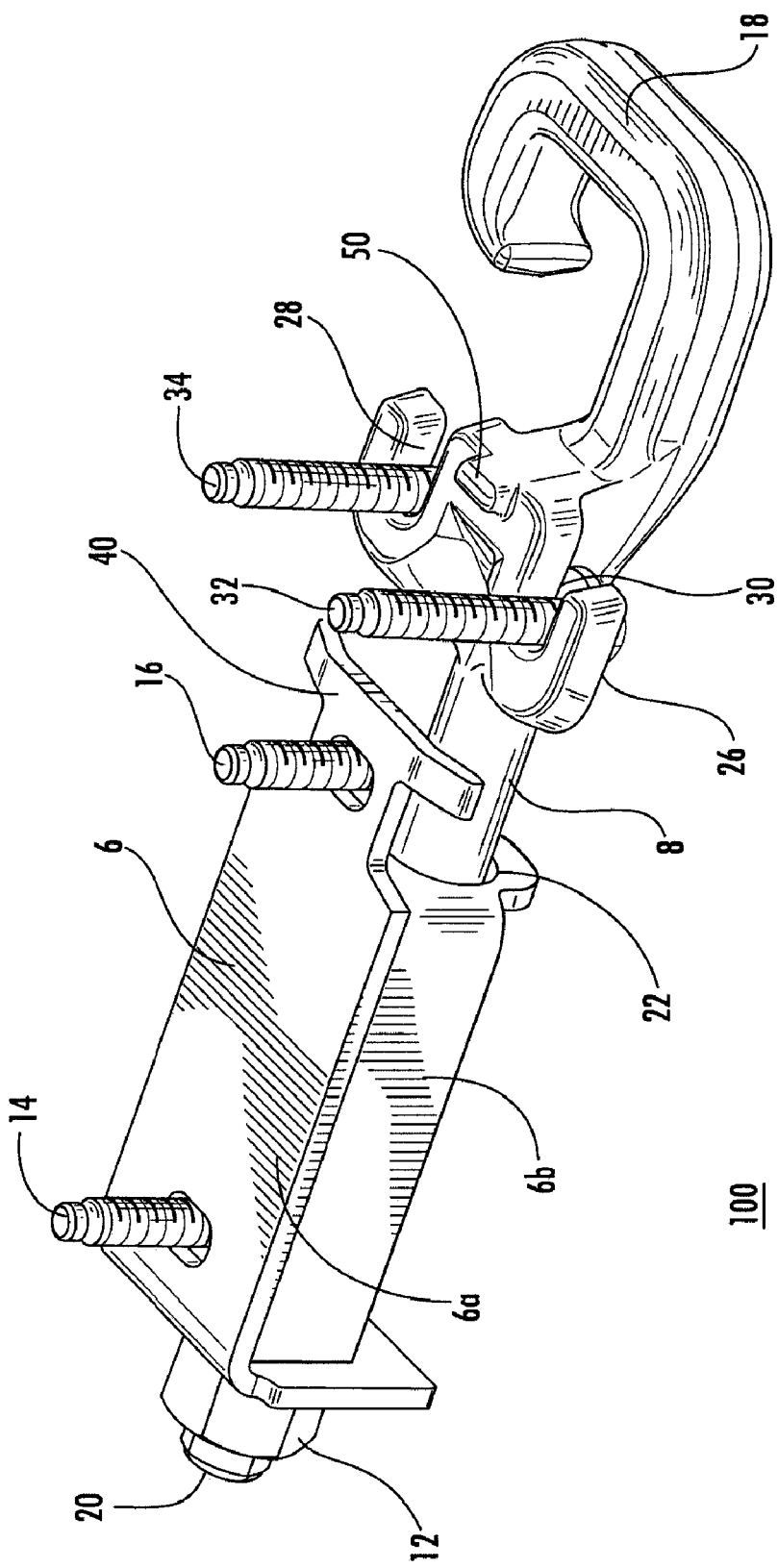
FIG. 4 is perspective view of the tow hook assembly according to another embodiment of the invention.

Referring now to FIGS. 4-6 illustrate another embodiment of a tow hook assembly 100 according to the invention. in FIGS. 4-6, like reference numbers denote like components to those in FIGS. 1-3, and the corresponding description thereof is omitted for the sake of brevity.

Similar to the embodiment of FIGS. 1-3, the tow hook assembly 100 shown in FIGS. 4-6 includes a mount bracket 6, a tow hook 8, a support bracket 10 and a fastener 12. The mount bracket 6 is preferably attached to the frame rail of the motor vehicle using bolts 14, 16. The mount bracket 6 is formed from two separate parts 6a and 6b, that are welded together. As shown in FIGS. 4-6, mount bracket part 6a is formed in an L-shape and includes aperture 24 (not shown). Mount bracket part 6a also preferably includes an alignment flange 40. Alignment flange 40 is preferably provided to assist in centering the mount bracket 6 on the frame rail of the motor vehicle. Mount bracket part 6b is formed in a substantial U-shape and includes aperture 22.

The tow hook 8 includes a tab 50 proximal to the towing end 18. The tab 50 is positioned and dimensioned to be in front of the support bracket 10 as shown in FIG. 6. The tab 50 is engineered so that the tow hook 8 will remain substantially in place until a force in a direction opposite to the towing direction exceeds a predetermined value that is less than the force required to deploy the vehicle air bags, preferably 0.5 times the gross domestic weight of the vehicle. Once the force exceeds this value, the tow hook 8 moves in the direction opposite the towing direction and the tab 50 deforms to allow movement of the tow hook 8 relative to the support bracket 10. Preferably, the tab 50 is configured to shear off of the tow hook 8. Alternatively, the tab 50 can be configured to deform the support bracket 10, or a combination of both deformation of the tab 50 and the support bracket 10.

In the preferred embodiments, the mount bracket, support bracket, tow hook and fastener are formed from materials of that allow the tow hook assembly to withstand a towing force of at least 2 times the gross domestic weight of the motor vehicle. For example, the mount bracket and the support bracket can be stamped from a steel sheet, bent and welded into the desired shape, the tow hook can be formed from forged steel, drawn wire or cast iron, and the fastener can be milled from steel, to name a few.

Of course, one skilled in the art may readily conceive of various modifications to the above described invention. For example, a bolt adapted to shear under a predetermined shear force may be used to attach the flange of the tow hook to the support bracket. In addition, one of skill in the art would appreciate that the support bracket can be provided with the slots (although facing in a direction opposite to the towing direction), while the flange of the tow hook is provided with holes that allow the bolts to pass therethrough for securing to the slots of the support bracket.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention and are intended to be covered by the following claims. Therefore, the present invention should not be limited by the specific disclosure herein, but only by the appended claims.

What is claimed is:

1. A tow hook assembly for a motor vehicle, the tow hook assembly comprising:
   a mount bracket;
   a tow hook having a towing end and a mounting end extending axially along a towing direction, the mounting end extending through the mount bracket;
   a fastener attached to the mounting end of the tow hook, the fastener configured to resist movement of the tow hook relative to the mount bracket in a towing direction and allow movement of the tow hook in a direction opposite to the towing direction; and
   a support bracket positioned proximal to the towing end of the tow hook and configured to support the towing end of the tow hook,
   wherein the tow hook includes a flange proximal to the towing end of the tow hook, the flange having at least one slot extending in the towing direction, and the tow hook is releasably attached to the support bracket via the flange and the at least one slot.

2. The tow hook assembly according to claim 1, wherein the mount bracket is configured to retain the tow hook within the mount bracket when the tow hook moves more than a predetermined distance in the direction opposite to the towing direction.

3. The tow hook assembly according to claim 1, wherein the fastener is a prevailing torque feature that is tuned to a weight of the motor vehicle.

4. The tow hook assembly according to claim 1, wherein the mounting end of the tow hook is a threaded end, and the fastener is a prevailing torque nut attached to the threaded end.

5. The tow hook assembly according to claim 1, wherein the tow hook is releasably attached to the support bracket with a bolt that extends through the at least one slot.

6. The tow hook assembly according to claim 1, wherein the mount bracket is adapted to be mounted to a frame of the motor vehicle and the support bracket is adapted to be mounted to an impact beam of the motor vehicle.

7. The tow hook assembly according to claim 1, wherein the tow hook includes a tab positioned to contact the support bracket so as to resist movement of the tow hook in the direction opposite to the towing direction.

8. The tow hook assembly according to claim 7, wherein at least one of the tab and the support bracket is configured to deform when a force in the direction opposite the towing direction exceeds a predetermined value so as to allow movement of the tow hook in the direction opposite to the towing direction.

9. The tow hook assembly according to claim 1, wherein the mount bracket includes an alignment flange.

10. The tow hook assembly according to claim 1, wherein the towing end of the tow hook is an open loop hook.

11. A tow hook assembly for a motor vehicle, the tow hook assembly comprising:
    a mount bracket;
    a tow hook having a towing end and a mounting end extending axially along a towing direction, the mounting end extending through the mount bracket;
    a support bracket positioned proximal to the towing end of the tow hook and configured to support the towing end of the tow hook; and
    a prevailing torque feature attached to the mounting end of the tow hook,
    wherein the tow hook includes a flange proximal to the towing end of the tow hook, the flange having at least one slot extending in the towing direction, the tow hook being releasably attached to the support bracket via the flange and the at least one slot.

12. The tow hook assembly according to claim 11, wherein the mount bracket is configured so as to retain the tow hook within the mount bracket when the tow hook is released from the support bracket.

13. The tow hook assembly according to claim 11, wherein the prevailing torque feature is tuned to a weight of the motor vehicle.

14. The tow hook assembly according to claim 11, wherein the mounting end of the tow hook is a threaded end, and the prevailing torque feature is a nut attached to the threaded end.

15. The tow hook assembly according to claim 11, wherein the mount bracket is adapted to be mounted to a frame of the motor vehicle and the support bracket is adapted to be mounted to an impact beam of the motor vehicle.

16. The tow hook assembly according to claim 11, wherein the tow hook includes a tab positioned to contact the support bracket so as to resist movement of the tow hook in the direction opposite to the towing direction.

17. The tow hook assembly according to claim 16, wherein at least one of the tab and the support bracket is configured to deform when a force in the direction opposite the towing direction exceeds a predetermined value so as to allow movement of the tow hook in the direction opposite to the towing direction.

* * * * *